P. E. SUNDQUIST.
CUTTER BAR.
APPLICATION FILED JUNE 9, 1908.

915,247.

Patented Mar. 16, 1909.

Witnesses
J. C. Simpson
M. J. Miller

Inventor
Petter E. Sundquist.
By Chandler & Chandler
Attorneys

UNITED STATES PATENT OFFICE.

PETTER E. SUNDQUIST, OF ALBANY, MINNESOTA.

CUTTER-BAR.

No. 915,247.  Specification of Letters Patent.  Patented March 16, 1909.

Application filed June 9, 1908. Serial No. 437,562.

*To all whom it may concern:*

Be it known that I, PETTER E. SUNDQUIST, a citizen of the United States, residing at Albany, in the county of Stearns, State of Minnesota, have invented certain new and useful Improvements in Cutter-Bars; and I do hereby declare the following to be a full, clear, and exact description of the invention, such as will enable others skilled in the art to which it appertains to make and use the same.

This invention relates to improvements in the cutter bars of mowers, harvesters, and like machines, and has for its object to simplify and improve the construction and provide a means whereby each individual knife may be detached or inserted without removing the cutter bar head from the machine.

With these and other objects in view the invention consists in a cutter bar having a spaced transverse recess for each sickle knife having undercut ends and with a depression in the bottom of each recess and sickle knives reduced at their rear ends to engage in the recesses and beneath the undercut ends thereof and with the shoulders, formed by reducing the rear ends, bearing against the forward face of the cutter bar, each knife provided with a resilient tongue adapted to engage in the depression in the recess and thus lock the sickle knives to the cutter bar.

Figure 1:
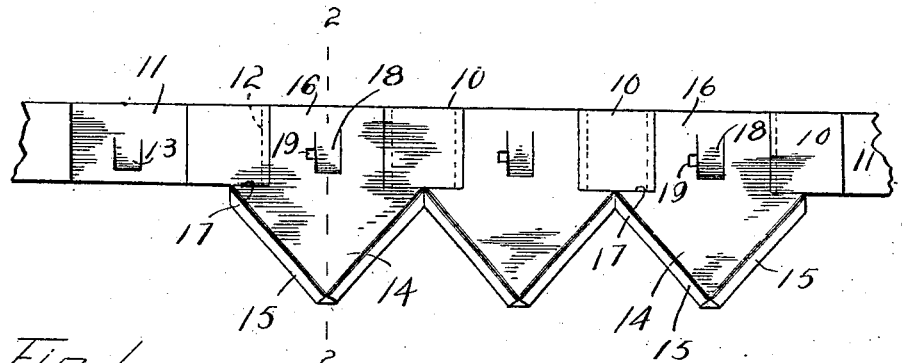
Figure 2:
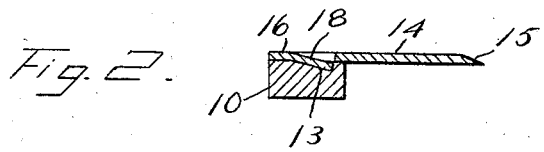
Figure 3:
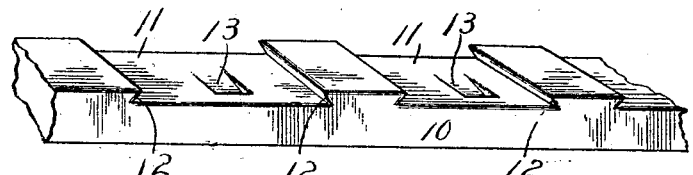
Figure 4:
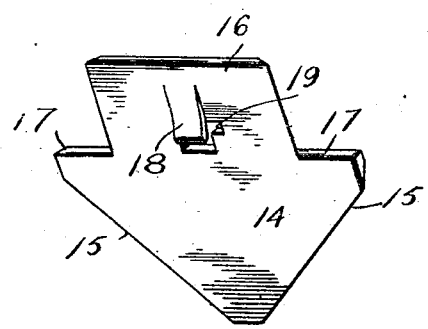

The invention further consists in certain novel features of construction as hereinafter shown and described and then specifically pointed out in the claims, and in the drawings illustrating the preferred embodiment of the invention, Figure 1 is a plan view of a portion of a cutter bar and a plurality of sickle knives connected thereto and with one of the sickle knives detached, illustrating the improved construction. Fig. 2 is a transverse section on the line 2—2 of Fig. 1. Fig. 3 is a perspective view of a portion of the cutter bar. Fig. 4 is an underneath perspective view of one of the sickle knives.

In the ordinary construction of sickle bars and sickle knives of harvesting machines, reapers, harvesters, and the like, the sickle knives are riveted to the cutter bar, and when a knife is broken or impaired it is necessary to remove the sickle bar, drive out the rivets and rerivet a new knife in its place, and this necessarily requires some mechanical skill on the part of the operator and often entails annoying delays and expense, and the principal object of the present invention is to provide a simply constructed cutter bar having detachable knives which may be readily detached in the event of breakage, and a new knife quickly inserted by any person without previous skill.

The improved device comprises a sickle bar 10 having spaced recesses 11, one recess for each of the sickle knives and with the ends of the recesses undercut or dovetailed as shown at 12, and with a depression 13 in the bottom of each recess, preferably centrally of the recess and longitudinally of the bar. The depression 13 is preferably formed with an inclined bottom with the deep portion next to the front of the sickle bar. The sickle knives are represented at 14 having the usual reversely inclined cutting edges 15 and with the rear portion reduced at 16 and the ends of the reduced portion inclined to correspond to, and engage the undercut ends of the recesses, the shoulders 17 formed by the reducing of the rear ends bearing against the front face of the cutter bar, as shown. By this simple means the rearward thrust is borne by the face of the cutter bar and the shoulders 17 and no danger exists of forcing the sickle knives rearwardly of the cutter bar.

Formed in each sickle knife is a U-shaped cleft whereby a tongue 18 is produced which may be bent down at its free end to engage in the depression 13 when the sickle knife is inserted into the recess 11, as shown in Fig. 2. The sickle knives being formed of steel highly tempered, the tongues 18 will be resilient to a very high degree and will bear with considerable force in the depressions 13, and thus effectually lock the sickle knives to the cutter bar.

In one side of each cleft a small cavity 19 is formed opening against one side of the tongue and providing means for the insertion of a suitable implement to release the tongue from the depression 13 when it is desired to remove the sickle knife. By this simple means it will be obvious that each sickle knife is firmly secured in position in the cutter bar and will effectually resist all strains to which it may be applied when in operation, the shoulders 17 effectually preventing any rearward movement, the undercut ends of the recesses 11 effectually preventing any upward movement, while the tongues 18 effectually prevent any forward movement, while at the same time each individual knife may be easily detached when required by simply inserting a small implement of suitable size and strength through the cavity 19 and beneath the tongue and the latter elevated to release it from the depression with which it is engaged and thus permit the sickle knife to be withdrawn. By this simple means when a sickle knife is broken or impaired it can be readily removed and a new one inserted in its place.

It frequently happens that one or more of the sickle knives require regrinding, and this can be readily done by simply removing the same from the cutter bar, grinding it, and returning it to its position without disturbing the cutter bar or the remaining sickle knives.

The device is simple in construction, can be inexpensively manufactured, and is applicable to all of the various makes of harvesting machinery without material structural changes therein.

What is claimed, is:—

1. The combination with a cutter bar having spaced transverse recesses with undercut ends and a depression in the bottom of each recess, and cutter knives having reduced rear ends engaging said recesses and bearing against the forward side of the cutter bar, each cutter knife having a resilient tongue bearing in the depression and locking the knife to the cutter bar.

2. The combination with a cutter bar having spaced transverse recesses with undercut ends and a depression in the bottom of each recess, and cutter knives having reduced rear ends engaging said recesses and bearing against the forward side of the cutter bar, each cutter knife having a resilient tongue bearing in the depression and locking the knife to the cutter bar and with a recess adjacent to the tongue to receive an implement whereby the tongue may be released from the depression.

3. The combination with a cutter bar having spaced transverse recesses with undercut ends and a depression in the bottom of each recess, and cutter knives having reduced rear ends engaging said recesses and bearing against the forward side of the cutter bar, each cutter knife having a U shaped cleft producing a tongue adapted to be depressed to engage in said depression.

4. The combination with a cutter bar having spaced transverse recesses with undercut ends and a depression in the bottom of each recess, and cutter knives having reduced rear ends engaging said recesses and bearing against the forward side of the cutter bar, each cutter knife having a U shaped cleft producing a tongue adapted to be depressed to engage in said depression and with a recess communicating with the cleft whereby an implement may be inserted beneath the tongue to release it from the depression.

In testimony whereof, I affix my signature, in presence of two witnesses.

PETTER E. SUNDQUIST.

Witnesses:
 E. KELLER,
 W. CHRISTEN.